US012248349B2

(12) United States Patent
Gao et al.

(10) Patent No.: US 12,248,349 B2
(45) Date of Patent: Mar. 11, 2025

(54) LAYERED SERIES-CONNECTED POWER SUPPLY CIRCUIT AND DATA PROCESSING DEVICE FOR SUPPLYING POWER TO COMPUTING CHIPS CONNECTED IN SERIES FROM BOTTOMMOST LAYER TO HIGHEST LAYER

(71) Applicant: SHENZHEN MICROBT ELECTRONICS TECHNOLOGY CO., LTD., Guangdong (CN)

(72) Inventors: Yang Gao, Guangdong (CN); Yuefeng Wu, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 113 days.

(21) Appl. No.: 17/922,905

(22) PCT Filed: Jul. 13, 2021

(86) PCT No.: PCT/CN2021/105918
§ 371 (c)(1),
(2) Date: Nov. 2, 2022

(87) PCT Pub. No.: WO2022/057415
PCT Pub. Date: Mar. 24, 2022

(65) Prior Publication Data
US 2023/0176637 A1    Jun. 8, 2023

(30) Foreign Application Priority Data

Sep. 17, 2020 (CN) ......................... 202010980205.6

(51) Int. Cl.
*G06F 1/26* (2006.01)

(52) U.S. Cl.
CPC .................................. *G06F 1/263* (2013.01)

(58) Field of Classification Search
CPC . G06F 1/263; G06F 1/26; G06F 15/78; G06F 15/7807; Y02D 10/00; G06Q 40/04
See application file for complete search history.

(56) References Cited

U.S. PATENT DOCUMENTS 5,828,207 A  * 10/1998  Saadeh ................... H02J 9/061
                                                          307/66
2014/0340142 A1  11/2014  Wong et al.
2021/0263575 A1 *  8/2021  Liu .......................... G11C 5/14

FOREIGN PATENT DOCUMENTS

CN        101859117 A      10/2010
CN        106774767 A       5/2017
(Continued)

OTHER PUBLICATIONS

International Search Report and Written Opinion mailed Aug. 26, 2021 in International Application No. PCT/CN2021/105918.

*Primary Examiner* — Danny Chan
(74) *Attorney, Agent, or Firm* — Dickinson Wright PLLC

(57) ABSTRACT

The present disclosure is directed to a series-connected power supply circuit and a data processing device. The series-connected power supply circuit comprises: at least two layers of to-be-powered chips (A1, A2, . . . , Am) connected in series between a first power supply end (A) and a second power supply end (B), with a highest-layer to-be-powered chip (Am) in the at least two layers of to-be-powered chips (A1, A2, . . . , Am) connected to the first power supply end (A), and a bottommost-layer to-be-powered chip (A1) in the at least two layers of to-be-powered chips (A1, A2, . . . , Am) connected to the second power supply end (B); and each layer of auxiliary power supply units (B1, B2, . . . , Bm), which is respectively connected to each layer of the to-be-powered chips (A1, A2, . . . , Am), (Continued)

wherein the first power supply end (A) is configured to receive a reference voltage.

6 Claims, 6 Drawing Sheets

(56) References Cited

FOREIGN PATENT DOCUMENTS

| | | | |
|---|---|---|---|
| CN | 107947566 | A | 4/2018 |
| CN | 108415320 | A | 8/2018 |
| CN | 207976832 | U | 10/2018 |
| CN | 208890646 | U | 5/2019 |
| CN | 110515875 | A | 11/2019 |
| CN | 210666681 | U | 6/2020 |
| CN | 213182661 | U | 5/2021 |
| WO | 2019120295 | A1 | 6/2019 |

* cited by examiner

LAYERED SERIES-CONNECTED POWER SUPPLY CIRCUIT AND DATA PROCESSING DEVICE FOR SUPPLYING POWER TO COMPUTING CHIPS CONNECTED IN SERIES FROM BOTTOMMOST LAYER TO HIGHEST LAYER

CROSS-REFERENCE TO RELATED APPLICATIONS

This application is a national stage of International Application No. PCT/CN2021/105918, filed on Jul. 13, 2021, which claims priority to Chinese Patent Application No. 202010980205.6, filed on Sep. 17, 2020. Both of the aforementioned applications are hereby incorporated by reference in their entireties.

TECHNICAL FIELD

The present disclosure relates to the technical field of power supply, and in particular, to the technical field for supplying power to computing chips connected in series, and specifically, to a series-connected power supply circuit and a data processing device.

BACKGROUND

With the development of the semiconductor processes, the operating supply voltages of integrated circuit chips are becoming increasingly low, and the operating currents of the integrated circuit chips are becoming increasingly large. To maximize the conversion efficiency of the power supply, the related technologies have begun to adopt chips connected in series for power supply, wherein multi-layer series-connected voltage domains are formed between the input end and the ground end of the power supply. However, there are still some problems when the existing to-be-powered chips use the series-connected power supply architecture.

Therefore, it is necessary to design a new optimized series-connected power supply solution.

SUMMARY

According to a first aspect of the present disclosure, a series-connected power supply circuit is provided, including: at least two layers of to-be-powered chips connected in series between a first power supply end and a second power supply end, with a highest-layer to-be-powered chip in the at least two layers of to-be-powered chips connected to the first power supply end, and a bottommost-layer to-be-powered chip in the at least two layers of to-be-powered chips connected to the second power supply end; and each layer of auxiliary power supply units that is connected to each layer of the to-be-powered chips, respectively; wherein the first power supply end is configured to receive a reference voltage.

According to a second aspect of the present disclosure, a data processing device is provided, including a control board and a hash board connected to the control board, the hash board including the foregoing series-connected power supply circuit.

Through the detailed description of exemplary embodiments of the disclosure, with reference to the following accompanying drawings, other features and advantages of the disclosure will become clear.

BRIEF DESCRIPTION OF THE DRAWINGS

The accompanying drawings that constitute a part of the specification illustrate embodiments of the disclosure, and are used to explain the principle of the disclosure together with the specification.

With reference to the accompanying drawings, according to the following detailed descriptions, the disclosure will be clearer, wherein.

Figure 1:
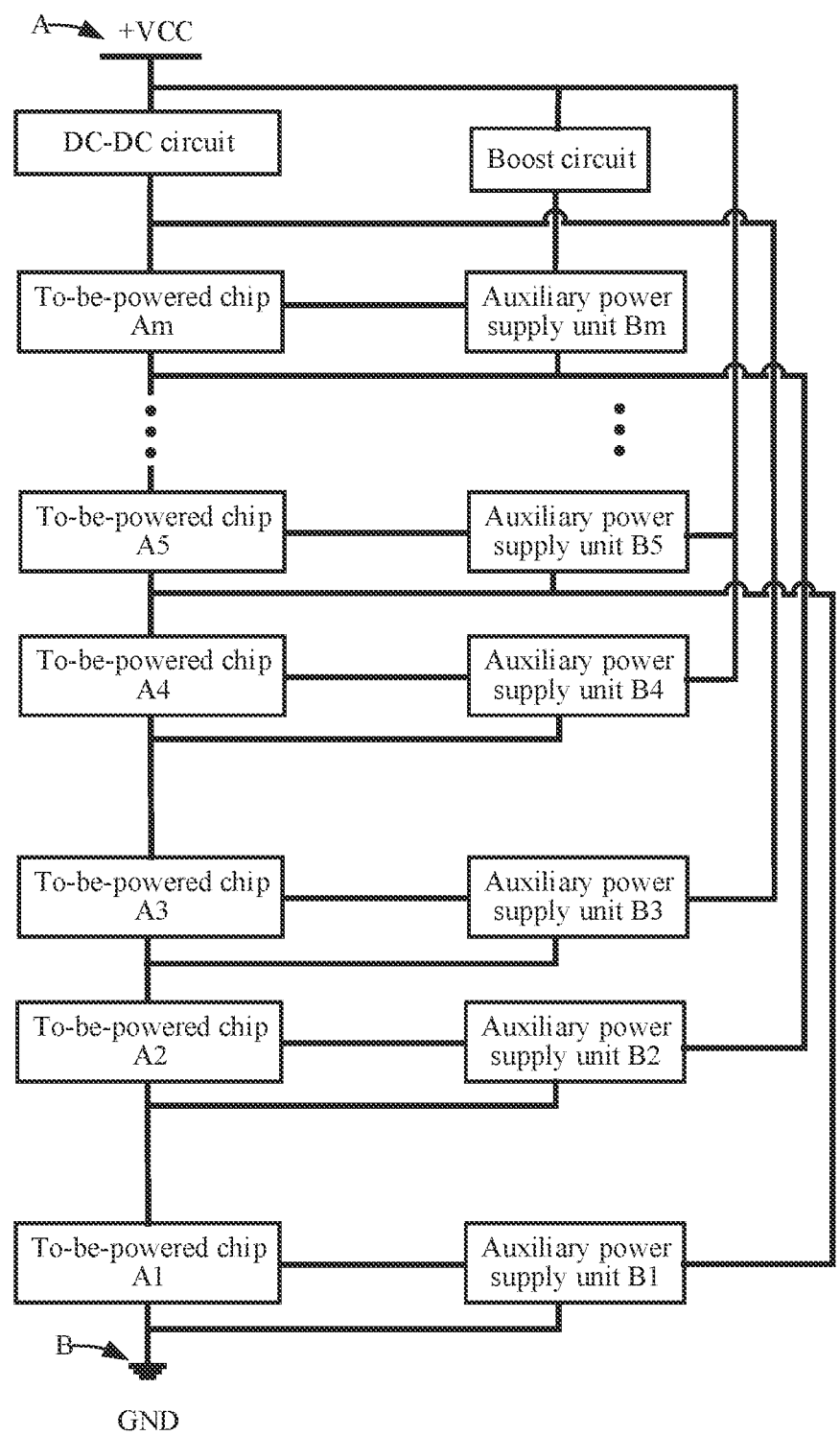
FIG. 1 schematically illustrates a schematic diagram of a series-connected power supply circuit in the related art.

It is to be noted that in the embodiments illustrated in the following, sometimes the same reference signs are used in different accompanying drawings to represent the same parts or parts with the same function, and repeated descriptions thereof are omitted. In the specification, similar numbers and letters are used to represent similar items. Therefore, once an item is defined in an accompanying drawing, the item in subsequent accompanying drawings will not be further discussed.

For ease of understanding, locations, sizes, scopes and the like of structures shown in the accompanying drawings sometimes do not represent practical locations, sizes, scopes and the like. Therefore, the disclosed invention is not limited to the locations, the sizes, the scopes and the like disclosed in the accompanying drawings, etc. Moreover, the accompanying drawings are not necessarily drawn to scale, and some features may be exaggerated to show the details of specific components.

DETAILED DESCRIPTION

The following describes in detail various exemplary embodiments of the disclosure with reference to the accompanying drawings. It is to be noted that unless otherwise specified, the relative deployment, the numerical expression, and values of the components and steps stated in the embodiments do not limit the scope of the disclosure.

In fact, the following descriptions of at least one exemplary embodiment are merely illustrative, and in no way put any limitation on this disclosure and the application or use thereof that is to say, circuits and methods in the disclosure are shown in an exemplary manner to describe different embodiments of the circuits or the methods in the present disclosure, and do not intend to be limiting. A person skilled in the art may understand that the circuits and the methods only illustrate the exemplary manner for implementing the present disclosure, rather than exhaustive manners.

Technologies, methods, and devices known to a person of ordinary skill in the art may not be discussed in detail, but in proper circumstances, the technologies, methods, and devices shall be regarded as a part of the specification.

The embodiments of the present disclosure can be applied to computer system/servers, which can operate together with a plurality of other universal or dedicated computing systems environments or configurations. Examples of at least one of the well-known computing systems, environments, and configurations that are suitable for use with the computer system/server include but are not limited to: personal computer systems, server computer systems, hand-held or laptop devices, microprocessor-based systems, set-top boxes, programmable consumer electronic products, network personal computers, minicomputer systems, mainframe computer systems, and distributed cloud computing technology environments including any of the foregoing systems, etc.

The computer system/server can be described in the general context of computer system-executable instructions (such as program modules) executed by computer systems. Usually, the program modules may include routines, programs, target programs, components, logics, data structures, etc., which execute specific tasks or implement specific abstract data types. The computer system/servers can be implemented in distributed cloud computing environments, in which tasks are performed by remote processing devices linked by communication networks. In the distributed cloud computing environments, the program modules can be located in local or remote computing system storage mediums that include storage devices.

Referring to FIG. 1, a schematic diagram of a series-connected power supply circuit in the related art is schematically illustrated. In specific practice, usually, a core voltage (that is, main working voltage) for a high current of a to-be-powered chip adopts a series-connected circuit for power supply. Power supply negative terminals of to-be-powered chips on higher layers are used as power supply ends for to-be-powered chips on lower layers, and power supply negative terminals of the to-be-powered chips on lower layers are used as power supply ends for to-be-powered chips on even lower layers. The to-be-powered chips are successively connected in series according to this connection relationship. Each to-be-powered chip is further connected to a corresponding auxiliary power supply unit, and the auxiliary power supply unit may be at least one of power supply generation circuits and chips, such as an ordinary low dropout regulator (LDO), and a direct current to direct current (DC/DC) power supply module. Specifically, for ease of introduction, the number of layers of the to-be-powered chips is m in FIG. 1 for the introduction. The to-be-powered chips on m layers are respectively referred to as a first to-be-powered chip A1, a second to-be-powered chip A2, a third to-be-powered chip A3, a fourth to-be-powered chip A4, a fifth to-be-powered chip A5, . . . , and an $m^{th}$ to-be-powered chip Am. Depending on factors like circuit configurations, each layer of the to-be-powered chips may include one to-be-powered chip, or a plurality of to-be-powered chips connected in parallel in the same voltage domain. Each layer of the to-be-powered chips is connected to a layer of auxiliary power supply unit, wherein auxiliary power supply units may be respectively referred to as a first auxiliary power supply unit B1, a second auxiliary power supply unit B2, a third auxiliary power supply unit B3, a fourth auxiliary power supply unit B4, a fifth auxiliary power supply unit B5, . . . , and an $m^{th}$ auxiliary power supply unit Bin. Depending on factors like configurations of the to-be-powered chips, each layer of the auxiliary power supply units may include one auxiliary power supply unit or a plurality of auxiliary power supply units.

As shown in FIG. 1, the series-connected power supply circuit includes the m layers of the to-be-powered chips connected in series between a power supply end A and a power supply end B. The power supply end A can also be referred to as a positive electrode of the series-connected power supply circuit, and the power supply end B can also be referred to as a negative electrode of the series-connected power supply circuit. Generally, in the related art, the power supply end A receives a supply voltage +VCC, and thus can also be referred to as a power supply end +VCC. Besides, because the power supply end B is usually grounded, the power supply end B can also be referred to as a ground end GND. Each layer of the to-be-powered chips has a main working voltage input end, an auxiliary working voltage input end, and a power supply negative terminal. The power supply end +VCC is connected to the main working voltage input end of the highest-layer to-be-powered chip Am, and the power supply negative terminal of each layer of the to-be-powered chips is connected to the main working voltage input end of a next-layer to-be-powered chip, so that a main working voltage is respectively provided for each layer of the to-be-powered chips via the main working voltage input ends. The series-connected power supply circuit further includes the auxiliary power supply units configured in correspondence to each layer of the to-be-powered chips. A power supply negative terminal of each layer of the auxiliary power supply units is connected to a power supply negative terminal of to-be-powered chips on the same layer, and an output end of each layer of the auxiliary power supply units is connected to the auxiliary working voltage input end of to-be-powered chips on the same layer, wherein an input end of at least one layer of auxiliary power supply units (such as the auxiliary power supply unit Bm in FIG. 1) is connected to an external power supply end for power supply, and input ends of remaining layers of the auxiliary power supply units are successively connected to main working voltage input ends of to-be-powered chips on corresponding layer under the highest-layer to-be-powered chip, so that auxiliary working voltages are provided by auxiliary power supply units for connected to-be-powered chips via the auxiliary working voltage input ends. The auxiliary power supply units can usually use an LDO module to provide the auxiliary working voltages for some special functional modules in the connected to-be-powered chips, such as input/output (I/O) modules and phase locking loop (PLL) modules, etc.

In some implementations, a series-connected power supply circuit including 6 layers of to-be-powered chips is used as an example, that is, descriptions are provided when m=6. In an example, the following descriptions are provided in a case that the main working voltage (that is, the core voltage) of each layer of the to-be-powered chips is 1.6 V and the power supply end +VCC provides a 12V DC supply voltage. Certainly, a person skilled in the art should understand that depending on aspects such as circuit hardware structures, circuit uses, and power supply configurations, the main working voltage of each layer of the to-be-powered chips is not limited to 1.6 V, and the supply voltage received by the power supply end +VCC is not limited to the 12V DC supply voltage. Generally speaking, the 12V DC voltage is converted to a 9.6V DC voltage by a DC-DC supply module to be used as the main working voltage of the to-be-powered chip Am on the sixth layer (the highest layer). It is assumed that an internal resistance of each layer of the to-be-powered chips is the same, a value of a voltage inputted to the main working voltage input end of each layer of the to-be-powered chips decreases successively, that is, 9.6 V, 8 V, 6.4

V, 4.8 V, 3.2 V, and 1.6 V, so that each layer of the to-be-powered chips can be provided with a main working voltage of about 1.6 V.

Besides, for special functional components such as I/O interfaces, phase locking loop (PLL) in each layer of the to-be-powered chips, in FIG. 1, these components are powered by the auxiliary working voltage provided by the auxiliary power supply unit configured in correspondence to a to-be-powered chip on the same layer. The auxiliary working voltage provided by the auxiliary power supply unit is usually higher than the main working voltage of each layer of the to-be-powered chips. In an example, the auxiliary working voltage (that is, an I/O voltage and a phase locking loop (PLL) voltage) provided by the auxiliary power supply unit for an auxiliary working voltage input end of the connected to-be-powered chip may be about 6 V, higher than the main working voltage 1.6 V of each layer of the to-be-powered chips. Certainly, a person skilled in the art should understand that depending on factors like the circuit configurations, the auxiliary working voltages provided by the auxiliary power supply units may be any appropriate value. The first few layers of the auxiliary power supply units can be powered by a 12V supply voltage, and the last few layers of the auxiliary power supply units can be powered by dividing the main working voltages of the first few layers of the to-be-powered chips, so as to ensure that a working voltage of about 6 V can be inputted to each of the auxiliary power supply units to ensure that each of the auxiliary power supply units can work normally. For example, the input ends of the auxiliary power supply units on the fifth layer and the fourth layer are respectively accessed to the 12V supply voltage. Therefore, working voltages of 12−6.4=5.6 V and 12−4.8=7.2 V are respectively inputted to the auxiliary power supply units on the fifth layer and the fourth layer, and fall within a scope of allowed working voltages. The input end of the auxiliary power supply unit on the third layer is accessed to the main working voltage input end of the to-be-powered chip on the sixth layer, and thus, a 9.6V voltage is provided for the input end of this auxiliary power supply unit, and the power supply negative terminal of the auxiliary power supply unit is connected to the 3.2V main working voltage of the to-be-powered chip on the second layer. Therefore, a working voltage of 9.6−3.2=6.4 V can be inputted to this auxiliary power supply unit. Similarly, the input end of the auxiliary power supply unit on the second layer is accessed to the main working voltage input end of the to-be-powered chip on the fifth layer. In this way, this auxiliary power supply unit is provided with a working voltage of 8−1.6=6.4 V. Therefore, the auxiliary power supply units on the first to fifth layers can be led out from the supply voltage or the main working voltage of to-be-powered chips on the higher layers, and be voltage-stabilized by an LDO or a BUCK, thereby outputting auxiliary working voltages used for the auxiliary power supply units.

However, in the current circuit structure, for the several highest layers of the to-be-powered chips, for example, the to-be-powered chips on the sixth layer in this example, the auxiliary power supply units require higher voltages, and cannot get power from the main working voltage of the to-be-powered chips on the higher layers. Therefore, another power supply is needed to provide a higher voltage source. For example, in a commonly used +VCC 12V voltage series-connected system, a boost circuit is often needed to boost the voltage, and then power is supplied to auxiliary power supply units of to-be-powered chips on several highest layers via the LDO.

Specifically, in this example, for the auxiliary power supply unit on the sixth layer, because a sufficient voltage difference cannot be formed between the supply voltage +VCC 12 V and a power supply negative electrode voltage 8 V of the auxiliary power supply unit on the sixth layer, an additional boost circuit is needed to boost the 12V voltage to a voltage of at least 14 V to ensure that the auxiliary power supply unit can also provide a 6V auxiliary working voltage.

However, because the voltage outputted by the boost circuit is relatively high, power consumption of the series-connected power supply circuit increases. In addition, because the circuit structure of the boost circuit is complicated, the cost of circuit components increases.

Moreover, in a case that there are many to-be-powered chips connected in series in the series-connected power supply circuit, for example, when a supply voltage is +VCC 48 V and the number of the to-be-powered chips is m=30, the boost circuit needs to boost the 48V voltage to a voltage of at least 48−1.6+6=52.4 V to form a sufficient voltage difference. In an actual operation, this voltage may be even higher. Thus, requirements for solutions of the boost circuit are relatively high.

In addition, for the existing circuit structure, in a circuit with a higher main working voltage, the range of the main working voltage changing during operation (the difference between a high-voltage output and a low-voltage output during the operation) is also relatively wide. Therefore, in order to be compatible with the high voltage output, the auxiliary working voltage of the auxiliary power supply unit needs to be higher than a highest voltage of the main working voltage by a certain amount. In this way, when the to-be-powered chip is adjusted to work at a low voltage, the auxiliary power supply unit will bear a large voltage difference and power loss, resulting in excessive heat generation of a power supply chip. For example, when power consumption of the to-be-powered chip is low, the auxiliary power supply unit bears a larger voltage difference.

Therefore, in the related art, the voltage of the power supply negative terminal of a bottommost-layer to-be-powered chip is used as a reference voltage. With the number of the layers in the series-connected power supply circuit increasing, when auxiliary power supply units on the several highest layers are powered through the boost circuit, the difference between voltages applied to the auxiliary power supply units on the several highest layers is increasingly large, which leads to high power consumption of the power supply chip and a large voltage difference borne by the power supply chip in the circuit of the related art.

Figure 2:
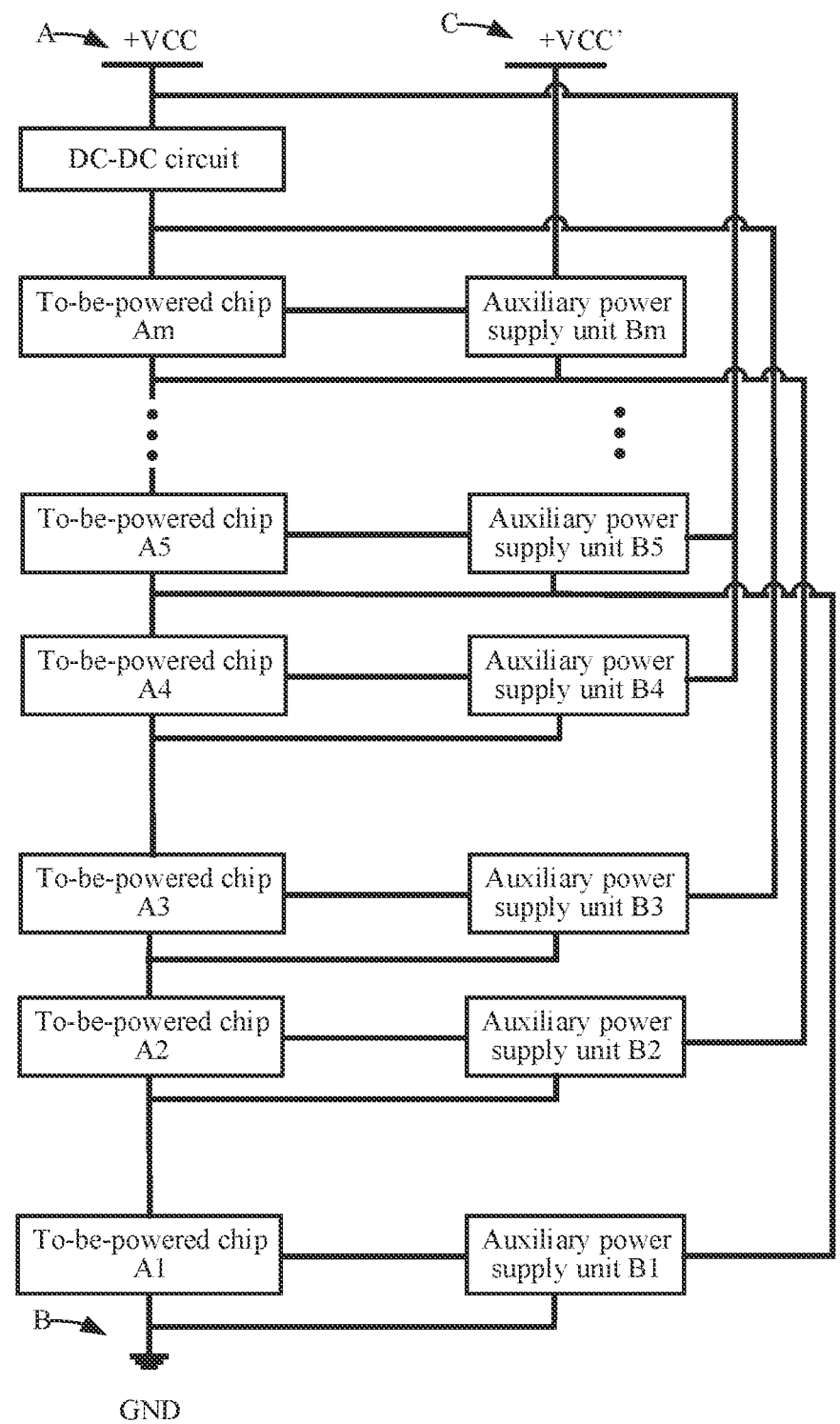
FIG. 2 schematically illustrates a schematic diagram of another series-connected power supply circuit in the related art.

Referring to FIG. 2, a schematic diagram of another series-connected power supply circuit in the related art is schematically illustrated. A difference between the series-connected power supply circuit in the related art in FIG. 2 and the series-connected power supply circuit in the related art in FIG. 1 is that a boosted voltage VCC' can be received through a power supply end C from an external circuit in FIG. 2. However, in the technical solution of FIG. 2, there are still problems such as a large voltage difference borne by an auxiliary power supply unit, and high power consumption of the auxiliary power supply unit, and so on.

Figure 3:
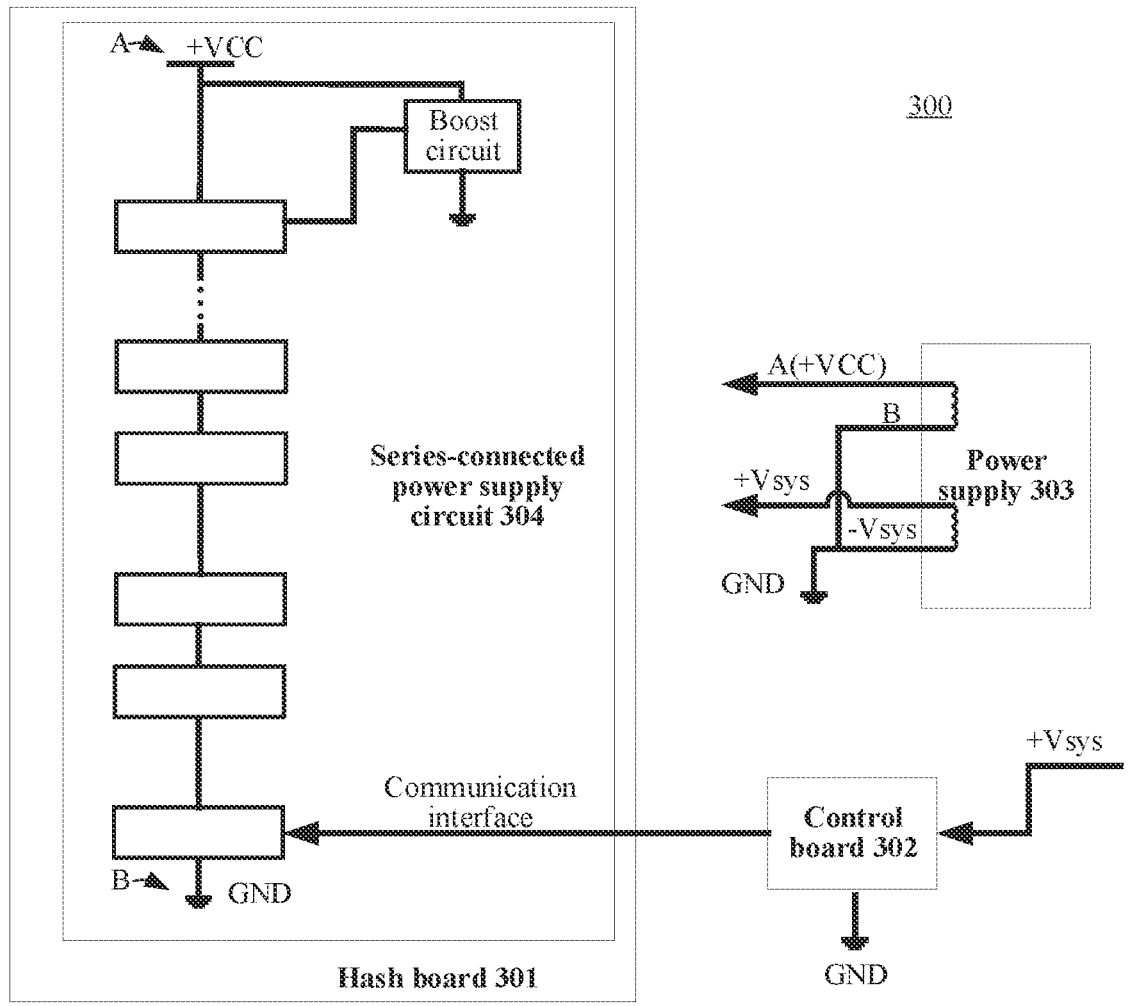
FIG. 3 schematically illustrates a structural block diagram of a data processing device in the related art.

Referring to FIG. 3, a structural block diagram of a data processing device 300 in the related art is schematically illustrated. The data processing device 300 specifically includes a control board 302, a power supply 303, and a hash board 301 that includes a series-connected power supply circuit 304. For simplicity in the accompanying drawing, FIG. 3 omits specific connections between to-be-powered chips and auxiliary power supply units in the series-connected power supply circuit 304. As shown in FIG. 3, in the related art, generally speaking, a negative electrode, that is, a power supply end B, of the hash board 301 is grounded, a positive electrode, that is, a power supply end A, of the hash board 301 receives a positive supply voltage +VCC, a negative electrode −Vsys of the control board 302 and a negative electrode B of the hash board 301 are grounded together, and a positive electrode +Vsys of the control board 302 is configured to receive a positive supply voltage from the power supply 303. Thus, in the related art, the hash board 301 and the control board 302 both use the negative electrode as a reference. Therefore, a control signal and a communication signal are accessed to the series-connected power supply circuit 304 from the control board 302 through a communication interface of a bottommost-layer to-be-powered chip in the series-connected power supply circuit 304, and are transmitted to higher layers one by one through the inside of the to-be-powered chips. A power supply input usually adopts a previous specification, that is, using a voltage of about +VCC 12 V to provide core voltages for the to-be-powered chips from a highest layer to a bottommost layer. The power supply 303 provides a supply voltage +Vsys used to power the control board 302, and a supply voltage +VCC used to power the hash board 301. In an example, the supply voltage +VCC used to power the hash board 301 and the supply voltage +Vsys used to power the control board 302 may not be isolated from each other on the side of the power supply 303.

In view of the above situations, the present disclosure aims to provide a DC high-voltage series-connected power supply circuit to realize simple power supply by an auxiliary power supply unit on a high voltage layer, and signal level matching and isolating, so as to enhance power supply efficiency without affecting system stability.

Figure 4:
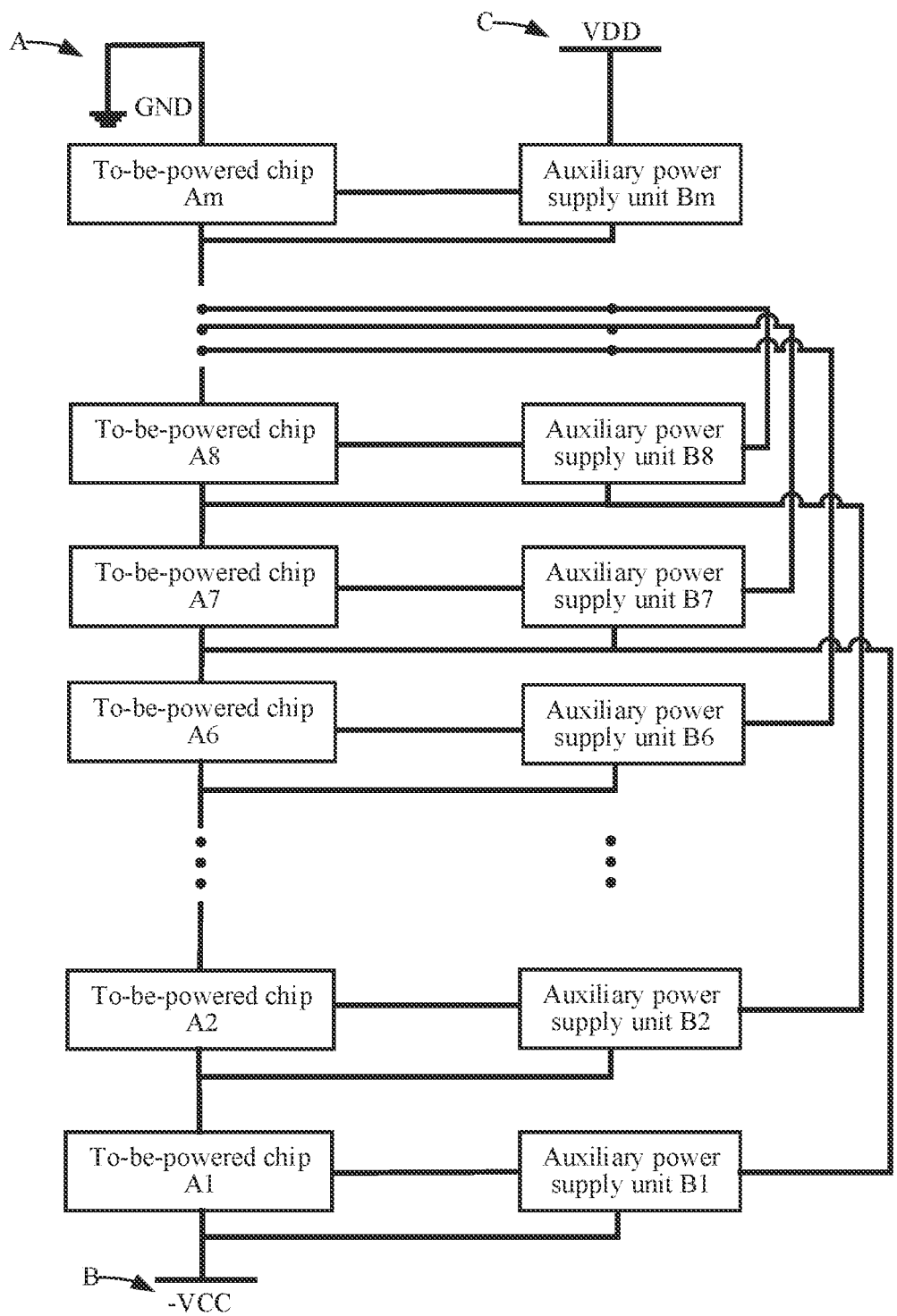
FIG. 4 schematically illustrates a schematic diagram of a series-connected power supply circuit according to an embodiment of the present disclosure.

Referring to FIG. 4, a schematic diagram of a series-connected power supply circuit according to an embodiment of the present disclosure is schematically illustrated. As shown in FIG. 4, the series-connected power supply circuit includes m layers of to-be-powered chips connected in series between a power supply end A and a power supply end B. The power supply end A can also be referred to as a positive electrode of the series-connected power supply circuit, and is configured to receive a reference voltage. The power supply end A being configured to receive a reference voltage means that in the series-connected power supply circuit, a voltage of the power supply end A is used as a reference to set or adjust voltages of other components. In an example, the power supply end A can be configured to receive a ground voltage, and therefore is also referred to as a ground (GND). However, a person skilled in the art should understand that the power supply end A can be configured to receive any appropriate reference voltage, not limited to the ground voltage. The power supply end B can also be referred to as a negative electrode of the series-connected power supply circuit, and is configured to receive a negative supply voltage −VCC relative to the reference voltage (in this example, the ground voltage GND). The power supply end B is thus also referred to as a power supply end −VCC. In some embodiments, the reference voltage (in this example, the ground voltage GND) is supplied for a main working voltage input end of a highest-layer to-be-powered chip Am, and a power supply negative terminal of each layer of the to-be-powered chips is connected to a main working voltage input end of a to-be-powered chip on a next layer, so that a main working voltage is respectively provided for each layer of the to-be-powered chips via the main working voltage input end. A power supply negative terminal of each layer of auxiliary power supply units is connected to a power supply negative terminal of to-be-powered chips on the same layer, and an output end of each layer of the auxiliary power supply units is connected to an auxiliary working voltage input end of to-be-powered chips on the same layer, wherein an input end of at least one layer of auxiliary power supply units (such as an auxiliary power supply unit Bm in FIG. 4) is connected to an external power supply end C for power supply, and input ends of remaining layers of the auxiliary power supply units are successively connected to main working voltage input ends of to-be-powered chips on corresponding layers under the highest-layer to-be-powered chip, so that auxiliary working voltages are provided for connected to-be-powered chips via the auxiliary working voltage input ends, with the external power supply end C being configured to receive a voltage VDD and thus also being referred to as a power supply end VDD.

With the development of the semiconductor processes, the layers of the to-be-powered chips connected in series in the series-connected power supply circuit may be increasing, and the main working voltage of each layer of the to-be-powered chips and a working voltage of each layer of the auxiliary power supply units may become lower. In some implementations, a series-connected power supply circuit with 40 layers of to-be-powered chips is used as an example, that is, descriptions are provided when m=40. In an example, the main working voltage (that is, the core voltage) of each layer of the to-be-powered chips can be 0.3 V, and a working voltage of about 1.8 V is inputted to each layer of the auxiliary power supply units. However, a person skilled in the art should understand that the working voltage listed herein is merely for convenience of descriptions. In actual application, depending on factors like circuit configurations, power supply configurations, and chip selections, the working voltage may change. The voltage listed herein only serves as an example, and is not intended to limit the present disclosure. In some examples, it is assumed that the main working voltage input end of the highest-layer to-be-powered chip Am receives the ground voltage GND from the power supply end A and the power supply negative terminal of a bottommost-layer to-be-powered chip A1 receives a negative supply voltage −VCC (−12 V) from the power supply end B, and that an internal resistance of each layer of the to-be-powered chips is the same. Then, a value of a voltage inputted to the main working voltage input end of each layer of the to-be-powered chips decreases successively, that is, 0 V, −0.3 V, −0.6 V, −0.9 V, . . . , and −12 V. In this way, each layer of the to-be-powered chips can be provided with a main working voltage of about 0.3 V.

In this example, because the auxiliary working voltage of the auxiliary power supply unit is 6 times of the main working voltage of the to-be-powered chip, the auxiliary power supply units on lower layers thus can be powered by dividing main working voltages of to-be-powered chips on the above 5 or more layers, so as to ensure that a working voltage of about 1.8 V can be inputted to each layer of the auxiliary power supply units. For example, in some examples, as shown in FIG. 4, the power supply negative terminal of the bottommost-layer to-be-powered chip A1 receives the −12V negative supply voltage −VCC, and the main working voltage input end of the bottommost-layer to-be-powered chip A1 receives a −11.7V working voltage. In addition, the power supply negative terminal of a to-be-powered chip A6 on the sixth layer receives a −10.5V voltage, and the main working voltage input end of the to-be-powered chip A6 on the sixth layer receives a −10.2V working voltage. In this case, if a bottommost-layer auxiliary power supply unit B1 receives a main working voltage of the main working voltage input end of the to-be-powered chip A6 on the sixth layer, the bottommost-layer auxiliary power supply unit B1 can be inputted a working voltage of about −10.2 V-(−12 V)=1.8 V. Therefore, in some examples, as shown in FIG. 4, the bottommost-layer auxiliary power supply unit B1 can be powered by the main working voltage of the to-be-powered chip A6 on the sixth layer. An auxiliary power supply unit B2 on the second layer can be powered by a main working voltage of a to-be-powered chip A7 on the seventh layer. An auxiliary power supply unit B6 on the sixth layer can be powered by a main working voltage of a to-be-powered chip A11 (not shown) on the eleventh layer. An auxiliary power supply unit B7 on the seventh layer can be powered by a main working voltage of a to-be-powered chip A12 (not shown) on the twelfth layer. An auxiliary power supply unit B8 on the eighth layer can be powered by a main working voltage of a to-be-powered chip A13 (not shown) on the thirteenth layer, and so on. An auxiliary power supply unit on the thirty-fifth layer can be powered by a main working voltage (that is, the ground voltage) of the main working voltage input end of a to-be-powered chip (not shown) on the fortieth layer. Therefore, the auxiliary power supply units on the first to thirty-fifth layers can be led out from the main working voltage input ends of the to-be-powered chips on higher layers, and be voltage-stabilized by an LDO or a BUCK, thereby outputting auxiliary working voltages used for the auxiliary power supply units.

In this example, for to-be-powered chips on the thirty-sixth layer and above, auxiliary power supply units need higher voltages, and cannot obtain power from core power supplies of to-be-powered chips on even higher layers. Therefore, another power supply is needed to provide a higher voltage source. For example, in this example, the voltage of the power supply negative terminal of the to-be-powered chip on the fortieth layer (that is, the highest-layer to-be-powered chip) is −0.3 V, and then the power supply end VDD needs to receive a voltage of about 1.5 V to provide the highest-layer auxiliary power supply unit with a working voltage of about 1.8 V. In addition, the voltage received from the power supply end VDD can be adjusted, for example, bucked, to provide working voltages for auxiliary power supply units on the thirty-sixth to thirty-ninth layers. For example, in an example, a 1.5V voltage received from the power supply end VDD can be bucked to a voltage of 1.2 V to be provided for an input end of an auxiliary power supply unit on the thirty-ninth layer.

In the related art where a negative electrode of a series-connected power supply circuit, that is, a power supply negative terminal of a bottommost-layer to-be-powered chip, is grounded, in a case that the series-connected power supply circuit includes 40 layers of to-be-powered chips, a main working voltage of each layer of to-be-powered chips is about 0.3 V, and auxiliary working voltage of each layer of auxiliary power supply units is about 1.8 V, a main working voltage input end of a highest-layer to-be-powered chip receives a 12V supply voltage, and a voltage of a power supply negative terminal of the highest-layer to-be-powered chip, that is, a power supply negative terminal of a highest-layer auxiliary power supply unit, is 11.7 V. An enough voltage difference cannot be formed between the 12V supply voltage and the 11.7V voltage of the power supply negative terminal of the highest-layer auxiliary power supply unit. Therefore, an additional boost circuit is needed to provide or receive from the outside a voltage of at least 12−0.3+ 1.8=13.5 V to ensure that the highest-layer auxiliary power supply unit can also provide a 1.8V auxiliary working voltage. Compared with the related art, the present disclosure does not configure a boost circuit, and therefore can simplify the circuit. Besides, because the power supply end VDD receives the voltage of about 1.5 V, power supply circuit loss of the power supply end VDD can be reduced.

The present disclosure is illustrated by an example in which each layer of the auxiliary power supply units obtains a main working voltage of the main working voltage input end of a to-be-powered chip on 5 layers upward to provide an auxiliary working voltage for the layer of auxiliary power supply unit. However, a person skilled in the art should understand that the present disclosure is not limited thereto. For example, in some embodiments, the auxiliary power supply units may need to provide a higher voltage for convenience of adjustment, and then each layer of the auxiliary power supply units can obtain a main working voltage of a to-be-powered chip on 6, 7 or more layers upward to provide an auxiliary working voltage for the layer of auxiliary power supply unit.

Therefore, in the present disclosure, the voltage of the main working voltage input end of the highest-layer to-be-powered chip is used as the reference voltage. With the layers in the series-connected power supply circuit increasing, even if several highest layers of auxiliary power supply units are powered through the external power supply end, because a voltage received from the external power supply end uses the reference voltage received by the highest-layer to-be-powered chip as a reference, voltages applied to the several highest layers of auxiliary power supply units are far lower than voltages applied when the voltage of the power supply negative terminal of the bottommost-layer to-be-powered chip is used as a reference. Therefore, power consumption of a power supply chip can be reduced. In addition, a difference between voltages applied to the several highest layers of the auxiliary power supply units is fixed relative to the reference voltage. Therefore, in the present disclosure, the change range of a difference between voltages applied to the several highest layers of the auxiliary power supply units is greatly reduced.

Moreover, a person skilled in the art can understand that a circuit diagram in FIG. 4 is only for describing the present disclosure more conveniently. In actual application, the series-connected power supply circuit can include other circuit components not shown in the diagram, such as a DC-DC power supply module, etc.

Therefore, the power supply circuit of this design realizes a simple and stable supplying solution of the auxiliary power supply units and core power supplies.

Figure 5:
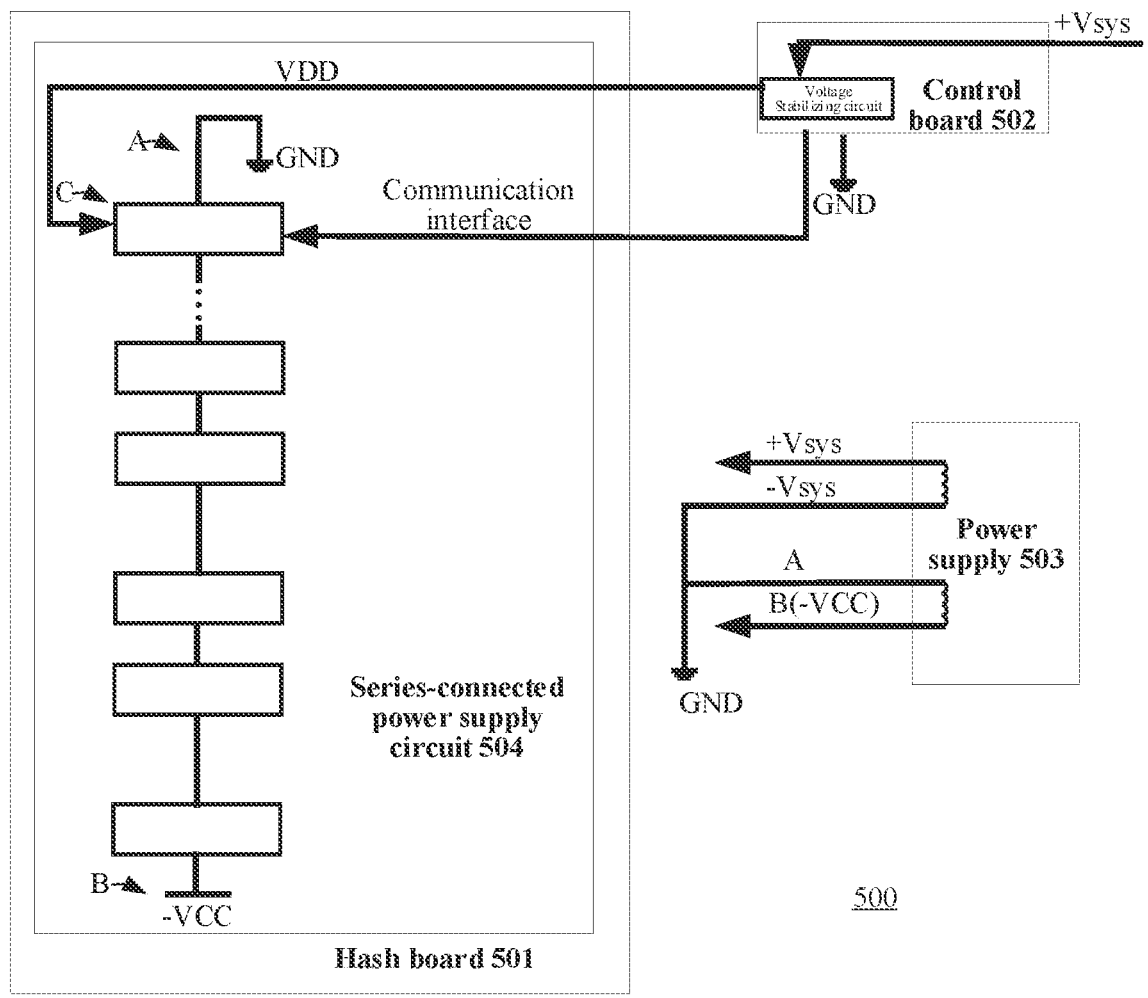
FIG. 5 schematically illustrates a structural block diagram of a data processing device according to an embodiment of the present disclosure.

Referring to FIG. 5, a structural block diagram of a data processing device 500 according to an embodiment of the present disclosure is schematically illustrated. The data processing device 500 specifically includes a control board 502, a power supply 503, and a hash board 501 that includes a series-connected power supply circuit 504. For simplicity in the accompanying drawing, FIG. 5 omits specific connections between to-be-powered chips and auxiliary power supply units in the series-connected power supply circuit 504 and other possible circuit components.

In an example shown in FIG. 5, a main working voltage input end of a highest-layer to-be-powered chip in the series-connected power supply circuit 504 on the hash board 501 is connected to a power supply end A which is configured to receive a reference voltage (a ground GND in this example). Therefore, in order to achieve matching of control signals and communication signals, a power supply negative electrode −Vsys of the control board 502 can be connected to a power supply positive electrode A of the hash board 501.

That is, the power supply negative electrode −Vsys of the control board 502 and the power supply positive electrode A of the hash board 501 are both grounded. Thus, in the technical solution, control signals and communication signals from the control board 502 can be accessed via a communication interface of the highest-layer to-be-powered chip and can pass through the to-be-powered chips connected in series to lower layers for communication. Moreover, the control signals and the communication signals of the control board 502 can be connected to the communication signals and the control signals of the highest-layer to-be-powered chip by means of common level shifting or isolation, so as to realize signal level matching. The means of level shifting or isolation may include, for example, optical coupling, transformers, capacitive coupling, a network interface, etc. For simplicity in the accompanying drawing, the level shifting or isolation is not shown in FIG. 5.

Besides, as shown in FIG. 5, the main working voltage input end (that is, the positive electrode of the hash board 501) of the highest-layer to-be-powered chip in the series-connected power supply circuit 504 and the negative electrode −Vsys of the control board 502 both receive the reference voltage (such as the ground voltage GND). Therefore, when the auxiliary power supply units on several highest layers in the series-connected power supply circuit 504 need an input voltage VDD that is higher than the reference voltage, a supply voltage of the control board 502 can be stabilized (such as, boosted or bucked) to provide this voltage. Therefore, in some embodiments, as shown in FIG. 5, the control board 502 can include a voltage stabilizing circuit which can provide a stabilized appropriate voltage to a power supply end C so as to power the auxiliary power supply units on the several highest layers in the series-connected power supply circuit 504. In some other embodiments, the control board 502 can directly output the supply voltage to the hash board 501, and the supply voltage is adjusted by an appropriate voltage stabilizing circuit on the hash board 501, to provide an appropriate voltage to the power supply end C so as to power the auxiliary power supply units on the several highest layers in the series-connected power supply circuit 504.

In the example shown in FIG. 5, the power supply 503 provides a supply voltage +Vsys used to power a positive electrode of the control board 502, and a supply voltage −VCC used to power a negative electrode (B) of the hash board 501. In some specific examples of the technical solution, in the power supply 503, a power supply configured to power the hash board 501 and a power supply configured to power the control board 502 are isolated inside the power supply. Certainly, the present disclosure is not limited thereto. A person skilled in the art can use any appropriate power supply configuration to provide supply voltages for the control board 502 and the hash board 501. For example, in some embodiments, the power supply configured to power the hash board 501 and the power supply configured to power the control board 502 can be directly connected in series inside a power supply unit. For example, the negative electrode −Vsys of the control board 502 is directly connected to the positive electrode A of the hash board 501 inside the power supply.

Figure 6:
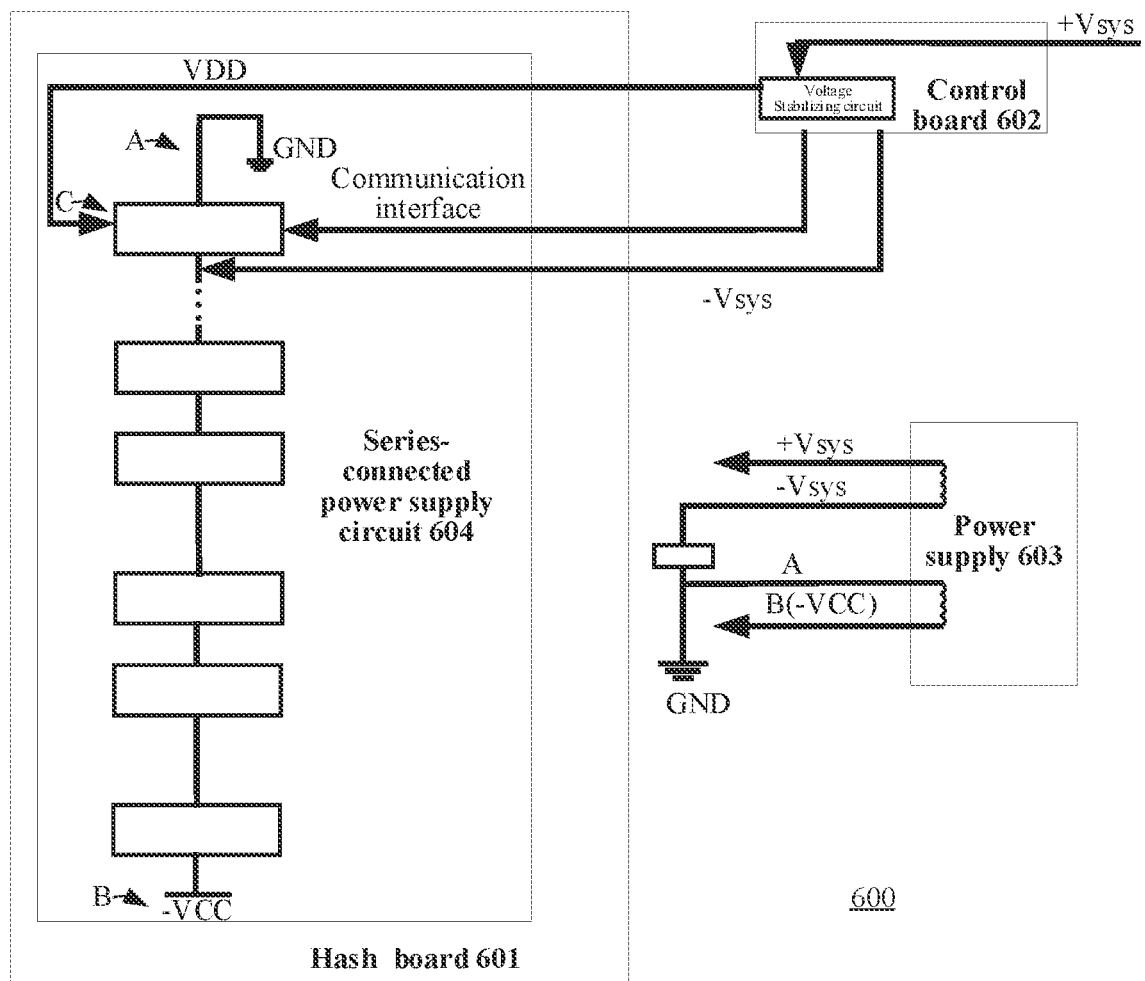
FIG. 6 schematically illustrates a structural block diagram of another data processing device according to an embodiment of the present disclosure.

Referring to FIG. 6, a structural block diagram of another data processing device 600 according to an embodiment of the present disclosure is schematically illustrated. In this example, the data processing device 600 specifically includes a control board 602, a power supply 603, and a hash board 601 including a series-connected power supply circuit 604. For simplicity in the accompanying drawing, FIG. 6 omits specific connections between to-be-powered chips and auxiliary power supply units in the series-connected power supply circuit 604 as well as other possible circuit components. In some embodiments, as shown in FIG. 6, the control board 602 may include a voltage stabilizing circuit which can provide a stabilized appropriate voltage to the power supply end C of the series-connected power supply circuit shown in FIG. 6 so as to power the auxiliary power supply units on several highest layers in the series-connected power supply circuit 604. In some other embodiments, the control board 602 can directly output the supply voltage to the hash board 601, and the supply voltage is adjusted by an appropriate voltage stabilizing circuit on the hash board 601, to provide an appropriate voltage to the power supply end C so as to power the auxiliary power supply units on the several highest layers in the series-connected power supply circuit 604.

In addition, in the example shown in FIG. 6, a main working voltage input end of a highest-layer to-be-powered chip is connected to a reference voltage (such as a ground GND). Therefore, in order to achieve matching of the control signals and the communication signals, a power supply negative electrode −Vsys of the control board 602 is connected to a power supply negative terminal of the highest-layer to-be-powered chip of the hash board 601. Therefore, in the technical solution, the control signals and the communication signals from the control board 602 can be accessed via a communication interface of the highest-layer to-be-powered chip and can pass through the to-be-powered chips connected in series to lower layers for communication. In this case, a positive electrode of the hash board 601, that is, a power supply end A is grounded, and the negative electrode of the control board 602 is connected to the power supply negative terminal of the highest-layer to-be-powered chip. Therefore, the control signals and the communication signals of the control board 602 communicate with the highest-layer to-be-powered chip of the series-connected power supply circuit to realize signal level matching.

In FIG. 6, the power supply 603 provides a supply voltage +Vsys used to power the control board 602 and a supply voltage −VCC used to power a negative electrode B of the hash board 601. In a specific example of the technical solution, in power supply 603, a power supply configured to power the hash board 601 and a power supply configured to power the control board 602 are isolated inside the power supply. Certainly, the present disclosure is not limited thereto. A person skilled in the art can use any appropriate power supply configuration to provide supply voltages for the control board 602 and the hash board 601.

Moreover, as shown in FIG. 6, the negative electrode −Vsys of the control board 602 is not grounded, but connected to the power supply negative terminal of the highest-layer to-be-powered chip in the series-connected power supply circuit, and is connected to the main working voltage input end of the highest-layer to-be-powered chip that receives a ground voltage, that is, the positive electrode A of the hash board through the highest-layer to-be-powered chip in the series-connected power supply circuit. Thus, in this case, signals of the control board communicate with the highest-layer to-be-powered chip in the series-connected power supply circuit to realize level matching. Therefore, no level shift or isolation chip may be needed to achieve the signal level matching.

In another example, the negative electrode −Vsys of the control board 602 can be connected to a power supply negative terminal of a to-be-powered chip on another layer other than the highest layer, and the signal level matching is achieved by an appropriate level shift or isolation chip.

Therefore, the technical solution provides a DC high-voltage series-connected power supply circuit to realize I/O power supply to a chip on a high voltage layer, and signal level matching and isolating, so as to enhance power supply efficiency without affecting system stability.

In all examples that are shown and discussed herein, any specific value should be interpreted only as an example and not as a constraint. Therefore, other examples of the exemplary embodiments may have different values.

In some embodiments, a series-connected power supply circuit is provided. The series-connected power supply circuit includes: at least two layers of to-be-powered chips which are connected in series between a first power supply end and a second power supply end, with a highest-layer to-be-powered chip in the at least two layers of to-be-powered chips connected to the first power supply end, and a bottommost-layer to-be-powered chip in the at least two layers of to-be-powered chips connected to the second power supply end; and each layer of auxiliary power supply units that is respectively connected to each layer of the to-be-powered chips; wherein the first power supply end is configured to receive a reference voltage.

In some embodiments, the reference voltage is a ground voltage, and the second power supply end is configured to receive a negative supply voltage.

In some embodiments, each layer of the to-be-powered chips has a main working voltage input end, an auxiliary working voltage input end, and a power supply negative terminal, wherein the first power supply end is connected to the main working voltage input end of the highest-layer to-be-powered chip, and the power supply negative terminal of each layer of the to-be-powered chips is connected to the main working voltage input end of a next-layer to-be-powered chip, so that a main working voltage is respectively provided for each layer of the to-be-powered chips through the main working voltage input end; and the power supply negative terminal of each layer of the auxiliary power supply units is connected to a power supply negative terminal of the to-be-powered chip on the same layer, and an output end of each layer of the auxiliary power supply units is connected to the auxiliary working voltage input end of the to-be-powered chip on the same layer, wherein an input end of at least one layer of auxiliary power supply unit is connected to an external power supply end for power supply, and input ends of remaining layers of the auxiliary power supply units are successively connected to main working voltage input ends of to-be-powered chips on corresponding layers under the highest-layer to-be-powered chip, so that an auxiliary working voltage is provided for a connected to-be-powered chip through the auxiliary working voltage input end.

In some embodiments, a data processing device is provided, wherein the data processing device includes a control board and a hash board connected to the control board, and wherein the hash board includes the foregoing series-connected power supply circuit.

In some embodiments, the control board includes a voltage stabilizing circuit which is configured to provide a stabilized voltage for the external power supply end.

In some embodiments, the data processing device further includes a power supply unit which is configured to provided supply voltages for the hash board and the control board.

In some embodiments, in the power supply unit, a supply voltage used for supplying power to the hash board and a supply voltage used for supplying power to the control board are isolated from each other.

In some embodiments, a power supply negative electrode of the control board is connected to a power supply positive electrode of the hash board, or a power supply negative electrode of the control board is connected to a power supply negative terminal of a highest-layer to-be-powered chip in the series-connected power supply circuit.

In some embodiments, control signals and communication signals from the control board are accessed to the series-connected power supply circuit via a communication interface of the highest-layer to-be-powered chip in the series-connected power supply circuit and pass through to-be-powered chips connected in series to lower layers for communication.

The terms "front", "rear", "top", "bottom", "above", "below" and the like in the description and in the claims, if any, are used for descriptive purposes and not necessarily for describing constant relative positions. It is to be understood that the terms used in such a way are interchangeable in proper circumstances so that embodiments of the present disclosure described herein can, for example, operate in other orientations different from those shown herein or otherwise described.

For example, as used herein, a term "exemplary" means "used as an example, instance, or illustration", and is not intended to be a "model" to be accurately copied. Any implementation illustratively described herein is not necessarily to be construed as preferred or advantageous over other implementations. Moreover, the disclosure is not limited by any expressed or implied principle in the foregoing technical field, background of the disclosure, summary, or description of embodiments.

For example, as used herein, a term "substantially" is intended to encompass any minor variation caused by at least one of design or manufacturing defect, device or component tolerance, environmental influences, and other factors. The term "substantially" also allows for differences from a perfect or an ideal situation due to parasitic effects, noise, and other practical considerations that may exist in an practical implementation.

The foregoing descriptions may indicate elements or nodes or features that are "connected" or "coupled" together. For example, as used herein, unless otherwise explicitly specified, "connected" means that one element/node/feature is directly connected to (or directly communicates with) another element/node/feature electrically, mechanically, logically, or in other manners. Similarly, unless otherwise explicitly specified, "coupled" means that one element/node/feature is directly or indirectly linked to another element/node/feature electrically, mechanically, logically, or in other manners to allow an interaction therebetween, even though the two features may not be directly connected. In other words, "coupled" is intended to include direct or indirect connections between components or other features, including connections by using one or more intermediate elements.

It is to be further understood that the term "include/comprise", when used in this specification, specifies the presence of at least one of stated features, integers, steps, operations, elements, and components, but does not preclude the presence or addition of at least one of one or more other features, integers, steps, operations, elements, and components, and/or combinations thereof.

A person skilled in the art should be aware that the boundaries between the foregoing operations is merely illustrative. A plurality of operations can be combined into a single operation, and a single operation can be distributed in an additional operation, and the operations can be performed at least partially overlapping in time. Moreover, alternative embodiments may include a plurality of examples of particular operations, and the operation sequence may be changed in other various embodiments. Other modifications, changes, and replacements, however, may also exist. Therefore, the specification and accompanying drawings are to be regarded as illustrative rather than restrictive.

Despite the detailed illustration of some particular embodiments of the present disclosure by the examples, a person skilled in the art should understand that the foregoing examples are merely intended to describe rather than limit the scope of the present disclosure. A person skilled in the art should also understand that various changes can be made to the embodiments without departing from the scope and spirit of the disclosure. The scope of the present disclosure is defined by the appended claim.

What is claimed is:

1. A data processing device including a control board and a hash board connected to the control board, wherein the hash board comprises a series-connected power supply circuit, comprising:
   at least two layers of to-be-powered chips connected in series between a first power supply end and a second power supply end, with a highest-layer to-be-powered chip in the at least two layers of to-be-powered chips connected to the first power supply end, and a bottom-most-layer to-be-powered chip in the at least two layers of to-be-powered chips connected to the second power supply end; and
   at least two layers of auxiliary power supply units, wherein each layer of auxiliary power supply units is respectively connected to each layer of the to-be-powered chips;
   wherein the first power supply end is configured to receive a reference voltage, and wherein the voltages of the to-be-powered chips and the auxiliary power supply units are set or adjusted by referring to the reference voltage at the first power supply end; and
   wherein each layer of the to-be-powered chips has a main working voltage input end, an auxiliary working voltage input end, and a power supply negative terminal, wherein the first power supply end is connected to the main working voltage input end of the highest-layer to-be-powered chip, and the power supply negative terminal of each layer of the to-be-powered chips is connected to the main working voltage input end of a next-layer to-be-powered chip, so that a main working voltage is respectively provided for each layer of the to-be-powered chips via the main working voltage input end;
   the power supply negative terminal of each layer of the auxiliary power supply units is connected to the power supply negative terminal of the to-be-powered chip on the same layer, and an output end of each layer of the auxiliary power supply units is connected to the auxiliary working voltage input end of the to-be-powered chip on the same layer, wherein an input end of at least one layer of auxiliary power supply unit is connected to an external power supply end for power supply, and input ends of remaining layers of the auxiliary power supply units are successively connected to main working voltage input ends of to-be-powered chips on corresponding layers under the highest-layer to-be-powered chip, so that an auxiliary working voltage is provided for a connected to-be-powered chip via the auxiliary working voltage input end;
   wherein a power supply negative electrode of the control board is connected to a power supply positive electrode of the hash board, or the power supply negative electrode of the control board is connected to a power supply negative terminal of a highest-layer to-be-powered chip in the series-connected power supply circuit;
   wherein control signals and communication signals from the control board are accessed to the series-connected power supply circuit via a communication interface of the highest-layer to-be-powered chip in the series-connected power supply circuit and pass through to-be-powered chips connected in series to lower layers for communication.

2. The data processing device according to claim 1, wherein the reference voltage is a ground voltage, and the second power supply end is configured to receive a negative supply voltage.

3. The data processing device according to claim 1, wherein the control board comprises a voltage stabilizing circuit which is configured to provide a stabilized voltage for the external power supply end.

4. The data processing device according to claim 1, wherein the data processing device further comprises a power supply unit for providing supply voltages for the hash board and the control board.

5. The data processing device according to claim 4, wherein in the power supply unit, a supply voltage used for powering the hash board and a supply voltage used for powering the control board are isolated from each other.

6. A data processing device including a control board and a hash board connected to the control board, wherein the hash board comprises a series-connected power supply circuit comprising:
   at least two layers of to-be-powered chips connected in series between a first power supply end and a second power supply end, with a highest-layer to-be-powered chip in the at least two layers of to-be-powered chips connected to the first power supply end, and a bottom-most-layer to-be-powered chip in the at least two layers of to-be-powered chips connected to the second power supply end; and
   at least two layers of auxiliary power supply units, wherein each layer of auxiliary power supply units is respectively connected to each layer of the to-be-powered chips;
   wherein the first power supply end is configured to receive a reference voltage, and wherein the voltages of the to-be-powered chips and the auxiliary power supply units are set or adjusted by referring to the reference voltage at the first power supply end; and
   wherein each layer of the to-be-powered chips has a main working voltage input end, an auxiliary working voltage input end, and a power supply negative terminal, wherein the first power supply end is connected to the main working voltage input end of the highest-layer to-be-powered chip, and the power supply negative terminal of each layer of the to-be-powered chips is connected to the main working voltage input end of a next-layer to-be-powered chip, so that a main working voltage is respectively provided for each layer of the to-be-powered chips via the main working voltage input end;
   the power supply negative terminal of each layer of the auxiliary power supply units is connected to the power supply negative terminal of the to-be-powered chip on the same layer, and an output end of each layer of the auxiliary power supply units is connected to the auxiliary working voltage input end of the to-be-powered chip on the same layer, wherein an input end of at least one layer of auxiliary power supply unit is connected to an external power supply end for power supply, and input ends of remaining layers of the auxiliary power supply units are successively connected to main working voltage input ends of to-be-powered chips on corresponding layers under the highest-layer to-be-powered chip, so that an auxiliary working voltage is provided for a connected to-be-powered chip via the auxiliary working voltage input end;

wherein the data processing device further comprises a power supply unit for providing supply voltages for the hash board and the control board;

wherein in the power supply unit, a supply voltage used for powering the hash board and a supply voltage used for powering the control board are isolated from each other.

* * * * *